(12) United States Patent
Westbrook et al.

(10) Patent No.: US 6,852,684 B1
(45) Date of Patent: Feb. 8, 2005

(54) NON-FLAMMABLE, HIGH-SOLVENCY COMPOSITIONS COMPRISING TRANS-1,2-DICHLOROETHYLENE, SOLVENT, AND INERTING AGENT

(75) Inventors: Greg A. Westbrook, Port Neches, TX (US); Thomas L. Tattersall, Wilmington, DE (US); Mark C. Wolff, Edgewood, KY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/398,234

(22) Filed: Sep. 17, 1999

Related U.S. Application Data
(60) Provisional application No. 60/101,182, filed on Sep. 21, 1998.

(51) Int. Cl.[7] ................................................. C11D 3/44
(52) U.S. Cl. ........................ 510/410; 510/408; 510/407
(58) Field of Search ................................ 510/407, 408, 510/410, 175, 176, 177, 411; 252/67, 8

(56) References Cited

U.S. PATENT DOCUMENTS

| | | | | |
|---|---|---|---|---|
| 4,961,869 A | * | 10/1990 | Eggers et al. | 510/177 |
| 5,026,498 A | | 6/1991 | Merchant | 252/171 |
| 5,064,560 A | | 11/1991 | Merchant | 252/171 |
| 5,116,525 A | | 5/1992 | Merchant | 252/171 |
| 5,116,526 A | * | 5/1992 | Magid et al. | 510/409 |
| 5,194,170 A | | 3/1993 | Merchant et al. | 252/67 |
| 5,196,137 A | * | 3/1993 | Merchant | 252/67 |
| 5,250,208 A | * | 10/1993 | Merchant et al. | 252/67 |
| 5,250,213 A | | 10/1993 | Rozen et al. | 252/162 |
| 5,514,221 A | | 5/1996 | Bolmer | 134/40 |
| 5,531,916 A | | 7/1996 | Merchant | 510/412 |
| 5,759,986 A | | 6/1998 | Merchant et al. | 510/415 |
| 5,814,595 A | * | 9/1998 | Flynn et al. | 510/411 |
| 5,827,446 A | * | 10/1998 | Merchant et al. | 252/8 |
| 5,851,977 A | | 12/1998 | Gorton et al. | 510/412 |
| 5,902,412 A | | 5/1999 | Taylor | |

FOREIGN PATENT DOCUMENTS

| | | | | |
|---|---|---|---|---|
| JP | 5-302098 | 11/1993 | ............ | C11D/7/50 |
| JP | 5-331489 | 12/1993 | ............ | C11D/7/50 |
| JP | 5-331490 | 12/1993 | ............ | C11D/7/50 |
| JP | 6-49490 | 2/1994 | ............ | C11D/7/30 |
| JP | 6-49491 | 2/1994 | ............ | C11D/7/30 |
| JP | 6-49492 | 2/1994 | ............ | C11D/7/30 |
| JP | 7-113098 | 5/1995 | ............ | C11D/7/50 |
| WO | WO 96/36688 | 11/1996 | ............ | C11D/7/50 |
| WO | WO 96/36689 | 11/1996 | ............ | C11D/7/50 |
| WO | WO 97/28229 | 8/1997 | | |
| WO | WO 97/41189 | 11/1997 | | |
| WO | WO 97/47704 | 12/1997 | | |
| WO | WO 98/37163 | 8/1998 | | |
| WO | WO 99/05253 | 2/1999 | ............ | C11D/7/50 |

OTHER PUBLICATIONS

Database WPI, Section Ch Week 199727; Derwent Publications Ltd., London, GB; Class E16, AN 1997–295276; XP002127852 & JP 09 111295 A (AG Technology KK). Apr. 28, 1997.

* cited by examiner

Primary Examiner—Gregory Webb
(74) Attorney, Agent, or Firm—Mark A. Edwards; Chyrrea J. Sebree

(57) ABSTRACT

Disclosed are non-flammable, high-solvency compositions having utility as cleaning agents in the electronics and refrigeration industries, and as a medium for mold release agents. The compositions are non-flammable by Flame Extension Test ASTM D-3065 and Flash Point-Tag Closed Cup Test ASTM D-56-82, and have a Kauri Butanol value of at least about 40 by ASTM 1133-94. The compositions comprise the components: a.) trans-1,2-dichloroethylene; and b.) solvent selected from: i.) oxygen-containing solvents selected from alcohols, ketones, esters, siloxanes, and ethers; and ii.) hydrocarbon solvents represented by $C_tH_{2t+2}$ or $C_tH_{2t}$, wherein t is from 4 to 8; and c.) an inerting agent selected from: i.) hydrofluorocarbon inerting agents represented by the formula $C_xH_yF_{(2x+2-y)}$, wherein x is from 3 to 8, y is from 1 to 4, and the mole ratio of F/H in the hydrofluorocarbon inerting agent is greater than 1.6; ii.) hydrofluorocarbon ether inerting agents represented by the formula $C_rF_{2r+1}OC_sH_{2s+1}$, wherein r and s are independently selected from 1 to 6, and r is greater than or equal to 2s; and iii.) hydrochlorofluorocarbon inerting agents represented by the formulae $C_2HCl_2F_3$, $C_2HClF_4$, and $C_3HCl_2F_5$.

14 Claims, No Drawings

NON-FLAMMABLE, HIGH-SOLVENCY COMPOSITIONS COMPRISING TRANS-1,2-DICHLOROETHYLENE, SOLVENT, AND INERTING AGENT

CROSS REFERENCE TO RELATED APPLICATIONS

This application claims the priority benefit of U.S. Provisional Patent Application No. 60/101,182, filed Sep. 21, 1998.

FIELD OF THE INVENTION

The present invention relates to non-flammable, high-solvency compositions comprising trans-1,2-dichloroethylene, oxygen-containing and/or hydrocarbon solvent, and fluorocarbon inerting agent. The compositions have utility as cleaning agents in the electronics and refrigeration industries, and as a medium for mold release agents.

BACKGROUND

It is well known that trans-1,2-dichloroethylene, a flammable cleaning agent, has fair solvency with a wide variety of difficult soils found in the electronics and refrigeration industries. It is further known that mixtures of trans-1,2-dichloroethylene and halocarbons have utility in cleaning applications. For example, trans-1,2-dichloroethylene blended with chlorofluorcarbon ("CFC")-113 ($CF_2ClCFCl_2$) in compositions formerly known as Freon® MCA and Freon® SMT. In the late 1980's, it was postulated that chlorofluorcarbons posed the risk of potential environmental problems (i.e. stratospheric ozone depletion and global warming). Notably, CFC-113 is an alleged depletor of stratospheric ozone. In view of the potential environmental problems associated with stratospheric ozone depletion, the above Freon® products were considered transitional materials possessing properties that make them useful substitutes for chlorofluorocarbons, while research for CFC-substitutes was conducted.

Additionally, trans-1,2-dichloroethylene has been reported to form azeotropes and azeotrope-like compositions with fluorocarbons and other solvents, as well as with 1,1,1,2,3,4,4,5,5,5-decafluoropentane, and alcohols, such as methanol and ethanol. However, the cleaning ability of these azeotrope-like compositions is compromised due to the minor amounts of trans-1,2-dichloroethylene and alcohol present.

Accordingly, users of industrial cleaning agents are faced with the dilemma: how does one find an environmentally acceptable alternative that retains non-flammability-without sacrificing cleaning power? Highly fluorinated solvents meet the environmental and. safety requirements, yet they are relatively weak solvents.

The present invention is advantageous in that it provides cleaning agents that are non-ozone depleting, low in global warming, non-flammable, and do not sacrifice cleaning power. Another advantage of the invention is that it departs from the paradigm that necessitates the use of azeotropes, wherein the evaporation rate of all components is essentially the same through the use of phased evaporation of the flammable and inerting components. The compositions of the present invention are useful in cleaning printed circuit cards or flushing oil and particles from refrigeration or air conditioning systems. Another advantage of the present invention is the process of depositing mold release agent on the surface of a mold.

For the foregoing reasons there is a need for cleaning agents that are non-ozone depleting, low in global warming, non-flammable, and do not sacrifice cleaning power. These and other features, aspects, and advantages of the present invention will become more apparent with reference to the following Summary, Description and appended claims.

SUMMARY

The present invention is directed to compositions that satisfy the aforesaid need. The invention comprises non-flammable, high-solvency compositions comprising trans-1,2-dichloroethylene, oxygen-containing and/or hydrocarbon solvent, and a fluorinated inerting agent. These inventive compositions are non-flammable by Flame Extension Test ASTM D-3065 and Flash Point-Tag Closed Cup Test ASTM D-56-82, and have a Kauri Butanol value of at least about 40 by ASTM 1133-94.

According to an embodiment of the present invention, a composition is provided which comprises the components:
a.) trans-1,2-dichloroethylene; and
b.) at least one solvent selected from:
   i.) oxygen-containing solvents selected from alcohols, ketones, esters, siloxanes, and ethers; and
   ii.) hydrocarbon solvents represented by $C_tH_{2t+2}$ or $C_tH_{2t}$, wherein t is from 4 to 12; and
c.) at least one inerting agent, selected from:
   i.) hydrofluorocarbon inerting agents represented by the formula $C_xH_yF_{(2x+2-y)}$, wherein x is from 3 to 8, y is from 1 to 4, the mole ratio of F/H: in the hydrofluorocarbon inerting agent is greater than 1.6, and wherein when the inerting agent is hydrofluorocarbon, the weight ratio of hydrofluorocarbon inerting agent to solvent is at least about 1.5; and
   ii.) hydrofluorocarbon ether inerting agents represented by the formula $C_rF_{2r+1}OC_sH_{2s+1}$, wherein r and s are independently selected from 1 to 6, r is greater than or equal to 2s, and wherein when the inerting agent is hydrofluorocarbon ether the weight ratio of hydrofluorocarbon ether inerting agent to solvent is at least about 3; and
   iii.) hydrochlorofluorocarbon inerting agents represented by the formulae $C_2HCl_2F_3$, $C_2HClF_4$, and $C_3HCl_2F_5$, and wherein when the inerting agent is hydrochlorofluorocarbon the weight ratio of hydrochlorofluorocarbon inerting agent to solvent is at least about 2.

According to another embodiment of the present invention, a process for removing residue from a surface is provided, which comprises: (a) contacting a surface with the above composition; and (b) recovering the surface substantially free of residue.

According to another embodiment of the present invention, a process for depositing mold release agent on the surface of a mold is provided, which comprises: (a) contacting the surface of the mold with the above composition; and (b) evaporating the components of said composition, with the exception of the mold release agent from the surface of the mold.

The present inventive compositions are non-ozone depleting alternatives to conventional chlorofluorocarbon and transitional hydrochlorofluorocarbon compositions, comprising chlorofluorocarbons, such as CFC-113 ($CF_2ClCCl_2F$), and hydrochlorofluorocarbons, such as HCFC-141b ($CCl_2FCH_3$), used for vapor and liquid phase cleaning. The present inventive compositions contain major amounts of trans-1,2-dichloroethylene and oxygen-containing or hydrocarbon solvent, and thus offer superior cleaning ability, while containing minor amounts of fluorinated inerting agents, which suprisingly render the present compositions non-flammable.

DETAILED DESCRIPTION

According to the present invention, the foregoing and other aspects, features, and advantages are attained by a composition comprising:
  a.) trans-1,2-dichloroethylene; and
  b.) at least one solvent selected from:
    i.) oxygen-containing solvents selected from alcohols, ketones, esters, siloxanes, and ethers; and
    ii.) hydrocarbon solvents represented by $C_tH_{2t+2}$ or $C_tH_{2t}$, wherein t is from 4 to 12; and
  c.) at least one inerting agent selected from:
    i.) hydrofluorocarbon inerting agents represented by the formula $C_xH_yF_{(2x+2-y)}$, wherein x is from 3 to 8, y is from 1 to 4, the mole ratio of F/H in the hydrofluorocarbon inerting agent is greater than 1.6, and wherein when the inerting agent is hydrofluorocarbon, the weight ratio of hydrofluorocarbon inerting agent to solvent is at least about 1.5; and
    ii.) hydrofluorocarbon ether inerting agents represented by the formula $C_rF_{2r+1}OC_sH_{2s+1}$, wherein r and s are independently selected from 1 to 6, r is greater than or equal to 2s, and wherein when the inerting agent is hydrofluorocarbon ether the weight ratio of hydrofluorocarbon ether inerting agent to solvent is at least about 3; and
    iii.) hydrochlorofluorocarbon inerting agents represented by the formulae $C_2HCl_2F_3$, $C_2HClF_4$, and $C_3HCl_2F_5$, and wherein when the inerting agent is hydrochlorofluorocarbon the weight ratio of hydrochlorofluorocarbon inerting agent to solvent is at least about 2. It is required that the above compositions are non-flammable by Flame Extension Test ASTM D-3065 and Flash Point-Tag Closed Cup Test ASTM D-56-82, and have a Kauri Butanol value of at least about 40 by ASTM 1133-94.

Oxygen-containing solvents of the present invention comprise hydrocarbon alcohols, ketones, esters, siloxanes, and ethers. Representative alcohols are those having a normal boiling point greater than about 60° C. and less than about 120° C. and represented by the formula $C_uH_{2u+1}OH$, wherein u is from 1 to 4. Such alcohols include methanol, ethanol, n-propanol, iso-propanol, and n-butanol. Representative ketones are those having a normal boiling point greater than about 50° C. and less than about 110° C. and represented by the formula $C_vH_{2v+1}COC_wH_{2w+1}$, wherein v and w are 1 or greater and v+w is at most 5. Such ketones include the hydrocarbon ketones, propanone and butanone. Representative esters are those having a normal boiling point greater than about 55° C. and less than about 130° C. and represented by the formula $C_kH_{2k+1}COOC_mH_{2m+1}$, wherein k and m are 1 or greater and k+m is at most 4. Such esters include the hydrocarbon esters, ethyl acetate and propyl acetate. Representative siloxanes include the hydrocarbon siloxanes, hexamethyldisiloxane $([(CH_3)_3Si]_2O)$, hexaethyldisiloxane $([(C_2H_5)_3Si]_2O)$, and octamethyltrisiloxane $((CH_3)_3SiOSi(CH_3)_2OSi(CH_3)_3)$. Representative ethers include the ethylene glycol dialkyl ethers of formula $C_aH_{2a+1}(OCH_2CH_2)_bOC_aH_{2a+1}$, wherein a is 1 to 3 and b is 1 to 6. Such ehters include bis(2-methoxyethyl) ether.

Hydrocarbon solvents of the present invention are those having a normal boiling point greater than about −15° C. and less than about 130° C., and represented by the formulae $C_tH_{2t+2}$ or $C_tH_{2t}$, wherein t is from 4 to 8. Representative hydrocarbon solvents include butane, pentane, hexane, heptane, octane, and their structural isomers such as cyclopentane, methylcyclopentane, and cyclohexane. With regard to the cleaning processes disclosed herein, when the present composition is delivered to the surface via aerosol, it preferred that that t is from 5 to 8.

Hydrofluorocarbon inerting agents of the present invention comprise hydrofluorocarbons represented by the general formula $C_xH_yF_{(2x+2-y)}$, wherein x is from 3 to 8, y is from 1 to 4, and the mole ratio of F/H in the individual hydrofluorocarbon inerting agent molecules is greater than 1.6. Representative hydrofluorocarbon inerting agents include: $CF_3CHFCF_3$ (HFC-227ea), $CF_3CF_2CF_2H$ (HFC-227ca), $CF_3CH_2CF_3$ (HFC-236fa), $CF_3CHFCF_2H$ (HFC-236ea), $CF_2HCF_2CF_2H$ (HFC-236ca), $CF_3CF_2CFH_2$ (HFC-236cb), $CH_2FCF_2CHF_2$ (HFC-245ca), $CHF_2CHFCHF_2$ (HFC-245ea), $CH_2FCHFCF_3$ (HFC-245eb), $CHF_2CH_2CF_3$ (HFC-245fa), $CF_3CF_2CF_2CF_2H$ (HFC-329p), $CF_3CF_2CFHCF_3$ (HFC-329me), $CF_3CF_2CF_2CFH_2$ (HFC-338q) $CF_3CF_2CH_2CF_3$ (HFC-338mf), $CF_3CF_2CFHCF_2H$ (HFC-338pe), $CF_3CFHCF_2CF_2H$ (HFC-338pce), $CHF_2CF_2CF_2CF_2H$ (HFC-338pcc), $CF_3CFHCFHCF_3$ (HFC-338mee), $CF_3CF_2CF_2CF_2CF_2H$ (HFC-42-11p), $CF_3CF_2CFHCF_2CF_3$ (HFC-42-11mce), $CF_3CF_2CF_2CFHCF_3$ (HFC-42-11me), $CF_3CF_2CH_2CF_2CF_3$ (HFC-43-10mcf), $CF_3CF_2CF_2CH_2CF_3$ (HFC-43-10mf), $CF_3CF_2CF_2CF_2CFH_2$ (HFC-43-10q), $CF_3CF_2CF_2CFHCF_2H$ (HFC-43-10pe), $CF_3CF_2CFHCF_2CF_2H$ (HFC-43-10pce), $CF_3CHFCHFCF_2CF_3$ (HFC-43-10mee), $CF_2HCF_2CF_2CF_2CF_2H$ (HFC-43-10pccc), $CF_3CFHCF_2CF_2CF_2H$ (HFC-43-10pcce), $CF_3CFHCF_2CFHCF_3$ (HFC-43-10mece), and $CF_3CF_2CF_2CF_2CF_2CF_2H$ (HFC-52-13p). Preferred of the hydrofluorocarbon inerting agents are $CF_3CH_2CF_3$ (HFC-236fa), $CF_3CHFCF_3$ (HFC-227ea), $CHF_2CF_2CF_2CF_2H$ (HFC-338pcc), and $CF_3CHFCHFCF_2CF_3$ (HFC-43-10mee).

Hydrofluorocarbon ether inerting agents of the present invention comprise hydrofluorocarbon ethers represented by the general formula $C_rF_{2r+1}OC_sH_{2s+1}$, wherein r and s are independently selected from 1 to 6 and r is greater than or equal to 2s. Representative hydrofluorocarbon ether inerting agents include $C_4F_9OCH_3$ and $C_4F_9OC_2H_5$.

Hydrochlorofluorocarbon inerting agents of the present invention comprise hydrochlorofluorocarbons represented by the formula $C_2HCl_2F_3$, $C_2HClF_4$, and $C_3HCl_2F_5$. Representative hydrochlorofluorocarbon inerting agents include: $CHCl_2CF_3$ (HCFC-123), $CHClFCF_2Cl$ (HCFC-123a), $CCl_2FCHF_2$ (HCFC-123b), $CHClFCF_3$ (HCFC-124), $CClF_2CF_2H$ (HCFC-124a), $CHF_2CCl_2CF_3$ (HCFC-225aa), $CHClFCClFCF_3$ (HCFC-225ba), $CHF_2CClFCClF_2$ (HCFC-225bb), $CHCl_2CF_2CF_3$ (HCFC-225ca), $CHClFCF_2CClF_2$ (HCFC-225cb), $CHF_2CF_2CCl_2F$ (HCFC-225cc), $CClF_2CHClCF_3$ (HCFC-225da), $CClF_2CHFCClF_2$ (HCFC-225ea), and $CF_3CHFCCl_2F$ (HCFC-225eb). Preferred of the hydrochlorofluorocarbon inerting agents are $CHCl_2CF_3$ (HCFC-123), $CHClFCF_3$ (HCFC-124), $CHCl_2CF_2CF_3$ (HCFC-225ca), and $CHClFCF_2CClF_2$ (HCFC-225cb).

The present composition comprises from about 40 to about 80 weight % of trans-1,2-dichloroethylene, from about 20 to about 45 weight % inerting agent, and about 15 weight % or less of solvent. Preferably, the compositions comprises from about 55 to about 75 weight % of trans-1,2-dichloroethylene, from about 20 to about 45 weight % inerting agent, and about 15 weight % or less of solvent. When the inerting agent comprises hydrofluorocarbon, the weight ratio of hydrofluorocarbon to solvent is at least about 1.5. When the inerting agent comprises hydrofluorocarbon ether, the weight ratio of hydrofluorocarbon ether to solvent is at least about 3. When the inerting agent comprises hydrochlorofluorocarbon, the weight ratio of hydrochlorofluorocarbon to solvent is at least about 2.

In an embodiment of the present invention when a composition contains more than one species of inerting agent (i.e., at least one compound selected from the group consisting of hydrofluorocarbon, hydrofluorocarbon ether, and hydrochlorofluorocarbon inerting agent species) the total amount of inerting agent required will be a weighted sum of the weights of individual inerting agent species; weighted by the ratio of inerting agent to solvent required for each inerting agent species. In other words, when a present composition contains more than one species of inerting agent, the present composition will obey the expression: $W^S = W^{HFC}/1.5 + W^{HFE}/3 + W^{HCFC}/2$, wherein $W^S$, $W^{HFC}$, $W^{HFE}$, $W^{HCFC}$ represent the weights of solvent, hydrofluorocarbon inerting agent, hydrofluorocarbon ether inerting agent, and hydrochlorofluorocarbon inerting agent, respectively, in the present composition.

The present compositions contain an inerting amount of inerting agent. By inerting amount is meant an amount of inerting agent which is sufficient to render the composition (i.e., mixture comprising trans-1,2-dichloroethylene, inerting agent, solvent, and other optional components such as aerosol propellant) non-flammable by the following two tests: Flame Extension Test (ASTM D-3065) and Flash Point—Tag Closed Cup Test (ASTM D-56-82). Both of the aforementioned ASTM test methods are herein incorporated by reference.

Present composition components are selected such that an inerting amount of inerting agent is maintained together with trans-1,2-dichloroethylene and solvent during delivery to the surface(e.g., as an aerosol, vapor, or liquid phase), after deposition on, and during evaporation from a surface. Appropriate selection assures that the evaporation rate of solvent and inerting agent from a surface is similar enough such that neither a flammable vapor nor liquid phase of solvent may form as the present composition evaporates from a surface. A multitude of variables affect evaporation rate and a quantitative relationship between these variables and evaporation rate of a compound is complex. However, the following equation allows for qualitative comparison of compounds at a given temperature: $R = 0.8217 \times P \times (MW)^{1/2}$, wherein R is defined as the evaporation index, P is the vapor pressure of the compound in mmHg at a given temperature, and MW is the molecular weight of the compound (see, Stratta, J. John; Dillon, Paul W.; and Semp, Robert H. in "Evaporation of organic cosolvents from water-borne formulations. Theory, experimental study, computer simulation", in J. Coat. Technol. (1978), 50(647), pages 39–47). The evaporation index is a relative measurement based on n-butyl acetate, wherein n-butyl acetate's evaporation index is set to 100. Exemplary evaporation indexes are provided for selected compounds in Table 1 below.

TABLE 1

Evaporation Index at 25° C. for Selected Compounds

| COMPOUND | Evaporation Index |
|---|---|
| trans-1,2-dichloroethylene | 2,654 |
| INERTING AGENT | |
| HFC-227ea (CF$_3$CFHCF$_3$) | 38,773 |
| HFC-236fa (CF$_3$CH$_2$CF$_3$) | 20,697 |
| HFC-245fa (CF$_3$CH$_2$CF$_2$H) | 10,411 |
| HCFC-225ca/cb 45/55 Wt % (CHCl$_2$CF$_2$CF$_3$/CHClFCFC$_2$CClF$_2$) | 3,395 |
| HFC-43-10mee (CF$_3$CFHCFHCF$_2$CF$_3$) | 2,948 |
| HFE-7100 (CH$_3$OC$_4$F$_9$) | 2,624 |
| SOLVENT | |
| Butane | 11,408 |
| Pentane | 3,632 |
| propanone (acetone) | 1,543 |
| Ethanol | 328 |
| iso-propanol | 280 |

In a preferred embodiment of the present invention, inerting agent and solvent are chosen such that the ratio of inerting agent/solvent evaporation indexes is from about 0.1 to about 100. More preferably, such ratio of evaporation indexes will be from about 0.5 to about 20, and most preferably, from about 5 to 10.

The present composition contains an effective amount of non-inerting agent components (i.e., trans-1,2-dichloroethylene and solvent). In one sense, an effective amount of non-inerting agent components is defined as an amount which is sufficient to remove at least some undesirable residue from a residue-containing surface, preferably, substantially all residue from the surface. By substantially all residue from the surface or a residue-free surface, is meant that the amount of residue remaining following contact of the surface with the present composition is either undetectable by the senses (e.g. visual: the naked eye or low magnification (10× or less)) and conventional analytical methodology used to detect the residue (e.g., omega brand surface ionic residue meter), or the fill amount of residue remaining on the surface after contact with the present composition has no consequence on further use of, or further processes carried out on, the surface.

An effective amount of non-inerting agent components in the present composition which removes substantially all residue from a surface to form a substantially residue-free surface may be further defined as an amount of non-inerting agent components which results in the present composition having a Kauri-Butanol value (Kb) of at least about 40, preferably about 100, when determined by ASTM D-1133-30 94. The aforementioned ASTM D-1133-9 test method is herein incorporated by reference. The Kb value reflects the ability of a composition to solubilize various organic residues (e.g, machine and conventional refrigeration lubricants).

An effective amount of non-inerting agent components in the present composition which removes substantially all residue from a surface to form a residue-free surface may be defined as an amount of such components which removes ionic residue from a surface to about 14.0 micrograms per square inch or less and leaves the surface substantially free of visible residue (i.e., no residue evident to the naked eye or up to 10× magnification). Common articles of manufacture containing ionic contamination which require precision cleaning are integrated circuit devices manufactured in part by a soldering process. It is critical to ensure cleanliness of surfaces to be connected prior to soldering. This is accomplished by using a temperature-activated rosin flux. The flux removes oxides and other contamination from the surfaces to be joined. After soldering, flux residues are preferably cleaned to about 14.0 micrograms per square inch or less to avoid failure of the integrated circuit device.

Another embodiment of the present composition comprises aerosol propellant. Aerosol propellant may assist in delivering the present composition from a storage container to a surface in the form of an aerosol. Aerosol propellant is optionally included in the present composition in up to about 25 weight percent of the total composition. Representative aerosol propellants comprise air, nitrogen, carbon dioxide, difluoromethane ($CF_2H_2$, HFC-32), trifluoromethane ($CF_3H$, HFC-23), difluoroethane ($CHF_2CH_3$, HFC-152a), trifluoroethane ($CH_3CF_3$, HFC-143a; $CHF_2CH_2F$, HFC-143), tetrafluoroethane ($CF_3CH_2F$, HFC-134a; $CF_2HCF_2H$, HFC-134), and pentafluoroethane ($CF_3CF_2H$, HFC-125).

Another embodiment of the present invention further includes processes for removing residue from a surface, comprising the steps of:

contacting the surface with the present composition, and recovering the surface substantially residue-free.

In one embodiment of the aforesaid processes, the surface comprises an integrated circuit device, the residue comprises soldering flux or oil, and the device is recovered substantially free of flux and oil following said contacting step. The method of contacting is not critical, and may occur by submersing the surface in the present composition or wiping the surface with the present composition. Preferably in this embodiment, the present composition further comprises aerosol propellant and the present composition is delivered to the surface during said contacting step as an aerosol.

In another embodiment of the aforementioned processes, the surface comprises the interior surface of a compression refrigeration apparatus, the residue comprises refrigerant, compressor lubricant (e.g., mineral oil, naphthenes, polyol ethers), particulates, and rust, and the inner surface of the compression refrigeration apparatus is recovered substantially free of residue following said contacting step. The method of contacting is not critical. Contacting may occur by flushing present composition in a liquid phase through a refrigeration apparatus. Present composition further comprising aerosol propellant is desirable in this embodiment, as the vapor pressure of the aerosol propellant may be used to move present composition throughout a refrigeration apparatus.

Another embodiment of the present invention includes mold release compositions and processes for depositing mold release agent on the interior surface of a mold. Polymer (e.g., thermolastic, thermoset, elastomer, rubber) articles may be manufactured by hot molding. A mold release agent is typically applied to the interior surface of the mold prior to polymer molding to reduce or negate the attractions between the mold surface and polymer. Mold release agent allows for facile release and recovery of a molded polymer article from a mold. Mold release agents used depend on the polymer being molded but are generally polymeric silicon-based organic compounds (e.g., silicones, siloxanes) or fluorinated organic polymers (e.g., tetrafluoroethylene homopolymer, or copolymers with other fluorinated and partially halogenated monomers) and are typically solid or viscous and tacky liquids at standard temperature. Such mold release agents are generally delivered to the interior surface of a mold as a solution or dispersion in a solvent which allows for ease in handling and homogenous distribution of a thin coating of mold release agent on the mold's surface. Mold release agent may be dissolved or dispersed in the present composition resulting in formation of a mold release composition. The present inventive mold release compositon, containing an inerting amount of inerting agent, is non-flammable. Further, the inerting agent present in the mold release compositon serves to dilute the concentration of trans-1,2-dichloroethylene and solvent which contacts the mold surface and polymers, thus compatabilizing the mold release composition with polymers and mold release surface which can be adversely affected by trans-1,2-dichloroethylene and solvent. This compatabilizing effect of the present inerting agent results in less hazing and swelling of polymeric mold components, surfaces, and connections. The present invention thus includes the present composition further comprising mold release agent for delivering and homogenously dispersing mold release agent upon the interior suface of a mold. The present compositon further comprising dissolved or dispersed mold release agent may be applied as a liquid or aerosol compositon to the surface of a mold. The present invention further includes processes for depositing mold release agent on the interior surface of a mold, comprising contacting the surface of the mold with the present compostion further comprising mold release agent, and evaporating the components of the composition other than mold release agent, thereby depositing mold release agent on the surface of the mold.

EXAMPLES

In the following examples, "Trans" refers to trans-1,2-dichloroethylene, "HCFC-225" refers to a mixture being 55-58 wt % HCFC-225ca ($CF_3CF_2CHCl_2$) and 42-45 wt % HCFC-225cb ($CF_2ClCF_2CHClF$), and "HCFC-141b" refers to $CCl_2FCH_3$.

Flammability Testing

The present composition, when delivered as an aerosol, has a flame extension not greater than 18" and a flash back of not greater than 6" per test method ASTM D-3065. This test method involves holding an aerosol can containing a composition for testing 6" from a lit plumbers candle and spraying it through a 2–3" flame and observing the length of flame extension back to the aerosol can with the the can's valve fully open. Flash back length is defined as the length the flame goes back from the candle back to the aerosol can. Candidate compositions were tested to find the minimum concentration of the inerting agent required to yield flame extension less than 18" and flash back of less than 6". Additionally, the present composition does not have a closed cup flash point per ASTM D-56-82. Results are described in Table 1.

Table 1—Aerosol Flammability Testing (per ASTM D-3065)

Compositions were put in an aerosol can with 20% propellant (HFC-134a) All compositions are reported in weight % of components.

Flame Extension >18" classifies an aerosol can as FLAMMABLE by DOT

Flash Back >61" classifies an aerosol can as EXTREMELY FLAMMABLE by DOT

"Flame" notes inches of flame extension

"Flash Back" notes any flame propagation back to aerosol can

"Fish Pt" is Flash Point by Tag Closed Cup (ASTM D-5682)

| Component | Weight % of Component in Composition | | | | | | | | | | | | |
|---|---|---|---|---|---|---|---|---|---|---|---|---|---|
| HFC-43-10mee | 4 | 0 | 0 | 4 | 4 | 4 | | | | | | | |
| Trans | 6 | 5 | 0 | 3 | 0 | 3 | 0 | 3 | 1 | 5 | 3 | 8 | |
| Ethanol | 0 | 5 | 0 | | | 3 | | 3 | 3 | 3 | 3 | 3 | |
| Methanol | | | | | | | | | | | | | |
| $C_4F_9OCH_3$ | | | | 4 | 4 | 6 | 2 | | | | | | |
| HCFC-225 | | | | | | | | | | | 4 | 9 | |
| HCFC-141b | | | | | | | | | | | | | 5 |
| Flame | 8+ | 8+ | 8+ | o | o | | | 8+ | 8+ | o | 8+ | | o |
| Flashback | o | o | o | o | o | o | o | o | o | o | o | o | o |
| Flash Point | | | | o | o | o | | | | o | | o | o |

Table 1 Summary: Minimum amount of inerting agent required for present aerosol compositon to have less than 18" of flame extension:

| | Weight % Components In Composition (& Excluding Propellant) | | |
|---|---|---|---|
| HFC-43-10mee | 19 (24) | — | — |
| $C_4F_9OCH_3$ | — | 34 (42) | — |
| HCFC-225 | — | — | 24 (29) |
| Trans | 51 (63) | 36 (45) | 46 (58) |
| Ethanol | 10 (13) | 10 (13) | 10 (13) |
| Propellant (HFC-134a) | 20 | 20 | 20 |

Cleaning Performance Testing

In a preferred sense, the present composition cleans ionic contamination (flux residue) from a surface to about 14.0 micrograms or less per square inch of surface area and leaves the surface substantially free of visible residue to the naked eye. The test used to determine surface cleanliness involved the following steps:

1. Kester 185 RMA rosin flux is painted liberally onto a FR-4 test board (an epoxy printed wiring board with tracing made of tinned copper),
2. The board so treated is then heated in an oven at 175° C. for 2 minutes to activate the rosin flux,
3. The board is then immersed in solder (Sn63, a 63/37 Sn/Lead solder) at 204° C. for 10 seconds,
4. The board is then cleaned (at room temperature) for 1 minute by immersing in present composition and providing gentle movement of the board,
5. The board is then visually inspected and tested (in triplicate) for residual ionics with an Omega Meter 600 SMD ionic analyzer.

Acceptance Criteria: Residual ionics below 14.0 micrograms per square inch and surface substantially free of residue.

| Flux Test (Blend #) | Visual Inspection | Residual Ionics ($\mu$g NaCl/in$^2$) |
|---|---|---|
| #1 | very light residue | 9.8, 6.9, 6.6 (7.8 avg) |
| #2 | no visible residue | 8.1, 7.9, 6.0 (7.3 avg) |
| #3 | very liqht residue | 7.4, 7.0, 9.7 (8.0 avg) |
| #4 | very light residue | 9.9, 7.6, 6.3 (7.9 avg) |
| #5 | very light residue | 6.1, 7.5, 9.6 (7.7 avg) |
| #6 | No visible residue | 5.0, 5.0, 4.7 (4.9 avg) |

Solvency Power

A measure of "solvency power"—the ability of a solvent to dissolve an organic residue—is the Kauri-Butanol value (Kb) determined by ASTM 1133-94. Compositions of the present invention have a Kb of at least about 40, preferrably at least about 50. In the present context, ASTM 113-94 comprises taking 10 grams of present composition and adding an oil/grease/fluid drop-wise until the solution becomes hazy and non-homogeneous, defining the solubility point or saturation point of that residue in the present composition. The data is reported in grams per 100 gram of present composition or weight percent solubility.

TABLE 2:

| | OIL SOLUBILITY AND Kb VALUE COMPARISION | | | | |
|---|---|---|---|---|---|
| | Blend # | | | | |
| Oil | 2 | 3 | 4 | 6 | n-propyl bromide |
| AM Drawing 2000 | 5.5 | 3.4 | 4.2 | 6.0 | 5.6 |
| Hardcut 541 | 30.4 | 8.4 | 25.0 | 33 | 32.4 |
| Houghton Rust Veto 76-mb | 43.8 | 26.3 | 36.1 | 40 | 42.5 |

| PERFORMANCE TESTING: BLENDS TESTED | | | | | | | |
|---|---|---|---|---|---|---|---|
| Blend # | HFC-43-10mee | $C_4F_9OCH_3$ | HCFC-225 | HCFC-141b | Trans | Ethanol | Methanol |
| #1 | 24 | — | — | — | 70 | 6 | — |
| #2 | 24 | — | — | — | 63 | 13 | — |
| #3 | 51 | — | — | — | 43 | — | 6 |
| #4 | — | 42 | — | — | 45 | 13 | — |
| #5 | — | — | — | 95 | — | — | 5 |
| #6 | — | — | 29 | — | 58 | 13 | — |

TABLE 2:-continued

OIL SOLUBILITY AND Kb VALUE COMPARISION

| Oil | Blend # | | | | n-propyl bromide |
|---|---|---|---|---|---|
| | 2 | 3 | 4 | 6 | |
| Mil-H-5606G Hydraulic Fluid | 22.8 | 14.8 | 16.9 | 20.8 | 23 |
| Tapmatic Cutting Fluid | 50.6 | 25 | 40 | 40 | 45.4 |
| Kb Value (ASTM D-1133-94) | 110 | 33 | 46 | >140 | 125 |

Solubility Tests with HVAC Lubricants

To establish the effectiveness of the present compositions in cleaning compression refrigeration apparatus, the solubility at room temperature of two refrigeration oils was examined in present composition as well as comparative materials, e.g., HCFC-141b ($CFCl_2CH_3$), the refrigeration industry standard in compression refrigeration system cleaning. The "mineral oil" lubricant tested was Carquest part no. 209500, "refrigeration Oil for R12 Air conditioning Systems". The PAG (polyalkylene glycol) oil tested was Pyroil PAG RL 488, "High Viscosity Oil for HFC-134a A/C System". All percentages reported are in weight percent of the total composition.

| Composition Tested | Mineral Oil Solubility | PAG Oil Solubility |
|---|---|---|
| HCFC-141b | yes, completely soluble | yes, completely soluble |
| C5 HFC | no, 2 phases formed | partial, after stirring |
| C3 HFC | no, 2 phases formed | partial, after stirring |
| C4 HFC | no, 2 phases formed | partial, after stirring |
| 67% HFC C5, 33% trans | partial, after stirring | yes, completely soluble |
| 96% C3 HFC, 4 wt % $C_5H_{12}$ or $C_6H_{14}$ | no, 2 phases formed | partial, after stirring |
| 50% C4 HFC, 35% C5 HFC, 15% trans | no, 2 phases formed | yes, completely soluble |
| 66% C5 HFC, 30% trans, 4% methanol | no, 2 phases formed | yes, completely soluble |
| 24% C5 HFC, 64% trans, 12% ethanol | yes, completely soluble | yes, completely soluble |
| HFE based solvent | no, 2 phases formed | partial, after stirring |
| 33% C5 HFC, 33% C4 HFC, 33% trans | no, 2 phases formed | yes, completely soluble |
| 20% C5 HFC, 40% C4 HFC, 40% trans | partial, after stirring | yes, completely soluble |
| 15% C5 HFC, 30% C4 HFC, 15% C3 HFC, 40% trans | no, 2 phases formed | no, 2 phases formed |
| 30% C5 HFC, 26% C4 HFC, 40% trans, 4% methanol | partial, after stirring | Yes, completely soluble |
| 25% C5 HFC, 30% C4 HFC, 45% trans | cloudy, partially soluble after stirring | N/A |
| 25% C5 HFC, | no, very | N/A |
| 30% C4 HFC, 45% n-propyl bromide | cloudy | |
| 31% C5 HFC, 29% C4 HFC, 50% trans | yes, completely soluble | yes, completely soluble |

What is claimed is:

1. A composition comprising:
   a.) about 55 to about 75 weight percent trans-1,2-dichloroethylene; and
   b.) about 15 weight percent or less of at least one solvent selected from the group consisting of:
      i.) oxygen-containing solvents selected from the group consisting of alcohols, ketones, esters, siloxanes, and ethers; and
      ii.) hydrocarbon solvents selected from the group consisting of those represented by $C_tH_{2t+2}$ and $C_tH_{2t}$, wherein t is from 4 to 12; and
   c.) about 20 to about 45 weight percent of at least one
      i.) hydrofluorocarbon inerting agents selected from the group consisting of those represented by the formula $C_xH_yF_{(2x+2-y)}$, wherein x is from 3 to 8, y is from 1 to 4, the mole ratio of F/H in the hydrofluorocarbon inerting agent is greater than 1.6, and wherein when the inerting agent is hydrofluorocarbon the weight ratio of hydrofluorocarbon inerting agent to solvent is at least about 1.5;
      ii.) hydrochlorofluorocarbon inerting agents selected from the group consisting of those represented by the formulae $C_2HCl_2F_3$ and $C_2HClF_4$, and wherein when the inerting agent is hydrochlorofluorocarbon the weight ratio of hydrochlorofluorocarbon inerting agent to solvent is at least about 2,
   wherein said composition is non-flammable by Flame Extension Test ASTM D-3065 and Flash Point-Tag Closed Cup Test ASTM D-56-82, and said composition has a Kauri Butanol value of at least about 40 by ASTM 1133-94.

2. The composition of claim 1, wherein said composition has a Kauri Butanol value of at least about 100 by ASTM 1133-94.

3. The composition of claim 1 or 2, wherein the ratio of (inerting agent evaporation index)/(solvent evaporation index) is from about 0.1 to about 100.

4. The composition of claim 1 or 2 wherein said oxygen-containing solvent is selected from the group consisting of alcohols having a normal boiling point greater than about 60° C. and less than about 120° C., and represented by the formula $C_uH_{2u+1}OH$, wherein u is from 1 to 4; ketones having a normal boiling point greater than about 50° C. and less than about 110° C., and represented by the formula $C_vH_{2v+1}COC_wH_{2w+1}$, wherein v and w are 1 or greater and v+w is at most 5; esters having a normal boiling point greater than about 55° C. and less than about 130° C., and represented by the formula $C_kH_{2k+1}COOC_mH_{2m+1}$, wherein k and m are 1 or greater and k+m is at most 4; siloxanes, hexamethyldisiloxane ($[(CH_3)_3Si]_2O$), hexaethyldisiloxane ($[(C_2H_5)_3Si]_2O$), and octamethyltrisiloxane ($(CH_3)_3SiOSi(CH_3)_2OSi(CH_3)_3$); and ethylene glycol dialkyl ethers represented by the formula $C_aH_{2a+1}(OCH_2CH_2)_bOC_aH_{2a+1}$, wherein a is 1 to 3 and b is 1 to 6.

5. The composition of claim 1 or 2 wherein said hydrocarbon solvent has a normal boiling point greater than about −15° C. and less than about 130° C.

6. The composition of claim 1 or 2 wherein said hydrofluorocarbon inerting agent is selected from the group consisting of $CF_3CHFCF_3$ (HFC-227ea), $CF_3CF_2CF_2H$ (HFC-227ca), $CF_3CH_2CF_3$ (HFC-236fa), $CF_3CHFCF_2H$ (HFC-236ea), $CF_2HCF_2CF_2H$ (HFC-236ca), $CF_3CF_2CFH_2$ (HFC-236cb), $CH_2FCF_2CHF_2$ (HFC-245ca), $CHF_2CHFCHF_2$ (HFC-245ea), $CH_2FCHFCF_3$ (HFC-245eb), $CHF_3CH_2CF_3$ (HFC-245fa), $CF_3CF_2CF_2CF_2H$ (HFC-329p), $CF_3CF_2CFHCF_3$ (HFC-329me), $CF_3CF_2CF_2CFH_2$ (HFC-338q), $CF_3CF_2CH_2CF_3$ (HFC-338mf), $CF_3CF_2CFHCF_2H$ (HFC-338pe), $CF_3CFHCF_2CF_2H$ (HFC-338pce), $CHF_2CF_2CF_2CF_2H$ (HFC-338pcc), $CF_3CFHCFHCF_3$ (HFC-338mee), $CF_3CF_2CF_2CF_2CF_2H$ (HFC-42-11p), $CF_3CF_2CFHCF_2CF_3$ (HFC-42-11mce), $CF_3CF_2CF_2CFHCF_3$ (HFC-42-11me), $CF_3CF_2CH_2CF_2CF_3$ (HFC-43-10mcf), $CF_3CF_2CF_2CH_2CF_3$ (HFC-43-10mf), $CF_3CF_2CF_2CF_2CFH_2$ (HFC-43-10q), $CF_3CF_2CF_2CFHCF_2H$ (HFC-43-10pe), $CF_3CF_2CFHCF_2CF_2H$ (HFC-43-10pce), $CF_3CHFCHFCF_2CF_3$ (HFC-43-10mee), $CF_2HCF_2CF_2CF_2CF_2H$ (HFC-43-10pccc), $CF_3CFHCF_2CF_2CF_2H$ (HFC-43-10pcce), $CF_3CFHCF_2CFHCF_3$ (HFC-43-10mece), and $CF_3CF_2CF_2CF_2CF_2H$ (HFC-52-13p).

7. The composition of claim 1 or 2 wherein said inerting agent comprises $CF_3CHFCHFCF_2CF_3$ (HFC-43-10mee), and said solvent comprises ethanol.

8. The composition of claim 7 comprising about 63 weight % trans-1,2-dichloroethylene, about 13 weight % ethanol, and about 24 weight % $CF_3CHFCHFCF_2CF_3$ (HFC-43-10mee).

9. The composition of claim 1 or 2 further comprising at least one aerosol propellant selected from the group consisting of air, nitrogen, carbon dioxide, difluoromethane, trifluoromethane, difluoroethane, trifluoroethane, and tetrafluoroethane.

10. A process for removing residue from a surface, comprising the steps of:
   a.) contacting the surface with the composition of claim 1, 2, 7, 8 or 9; and
   b.) recovering the surface substantially free of residue.

11. The process of claim 10, wherein the surface comprises an integrated circuit device, and the residue comprises soldering flux.

12. The process of claim 10, wherein the surface comprises an interior surface of a compression refrigeration apparatus, and the residue comprises conventional refrigeration lubricant, particulates, and/or rust.

13. The composition of claim 1 or 2 further comprising a mold release agent.

14. A process for depositing mold release agent on the surface of a mold, comprising:
   a.) contacting the surface of the mold with the composition of claim 13; and
   b.) evaporating the components of said composition, with the exception of the mold release agent, from the surface of the mold.

* * * * *